(12) United States Patent
Breuss et al.

(10) Patent No.: US 7,325,467 B2
(45) Date of Patent: Feb. 5, 2008

(54) LOCKING DEVICE OF A STEERING COLUMN ADJUSTABLE IN AT LEAST ONE ADJUSTMENT DIRECTION

(75) Inventors: Hubert Breuss, Feldkirch-Gisingen (AT); Christoph Klukowski, Walenstadt (CH); Christian Lutz, Nüziders (AT)

(73) Assignee: ThyssenKrupp Presta AG, Fürstentum (LI)

( * ) Notice: Subject to any disclaimer, the term of this patent is extended or adjusted under 35 U.S.C. 154(b) by 689 days.

(21) Appl. No.: 10/893,436

(22) Filed: Jul. 19, 2004

(65) Prior Publication Data

US 2005/0016315 A1    Jan. 27, 2005

(30) Foreign Application Priority Data

Jul. 21, 2003    (DE) ................................. 103 33 228

(51) Int. Cl.
    *B62D 1/18*    (2006.01)
(52) U.S. Cl. .......................................... 74/493; 280/775
(58) Field of Classification Search .................. 74/492, 74/493; 280/775, 777
    See application file for complete search history.

(56) References Cited

U.S. PATENT DOCUMENTS

| 5,787,759 | A | 8/1998 | Olgren | |
|---|---|---|---|---|
| 6,851,332 | B2 * | 2/2005 | Bechtel et al. | ................. 74/493 |
| 2004/0261565 | A1 * | 12/2004 | Uphaus et al. | ................. 74/493 |
| 2005/0017492 | A1 * | 1/2005 | Ohtsu et al. | ................. 280/775 |
| 2006/0090586 | A1 * | 5/2006 | Lee | ............... 74/492 |
| 2006/0156853 | A1 * | 7/2006 | Sorensen | ..................... 74/492 |
| 2006/0273568 | A1 * | 12/2006 | Manwaring et al. | ........ 280/777 |

FOREIGN PATENT DOCUMENTS

| DE | 39 14608 | 5/1989 |
|---|---|---|
| DE | 198 39 496 | 3/2000 |
| DE | 198 46 292 | 4/2000 |
| DE | 101 30 587 | 1/2002 |
| EP | 0 796 780 | 9/1997 |
| EP | 0 836 981 | 4/1998 |
| EP | 1 125 821 | 8/2001 |

* cited by examiner

*Primary Examiner*—David M. Fenstermacher
(74) *Attorney, Agent, or Firm*—Wenderoth, Lind & Ponack, L.L.P.

(57) ABSTRACT

A locking device of a steering column adjustable in at least one adjustment direction (46) comprises at least one locking part (20, 21) associated with the adjustment direction (46) or one of the adjustment directions, at least one counterlocking part (14, 15) associated with this adjustment direction (46) and an openable and closable tensioning arrangement, in the opened state of which first and second toothings (38, 39) of locking parts (20, 21) are spaced apart from first and second countertoothings (40, 41) of the counterlocking part (14, 15), and in the closed state of which the locking part (20, 21) and the counterlocking part (14, 15) engage each other's teeth. The planes (47, 48; 49, 50) of the tips of teeth (42, 43; 44, 45) of the first and second toothings (38, 39) or first and second countertoothings (40, 41) are disposed in a V shape relative to one another and between the teeth (42, 43; 44, 45) of the first and second toothing (38, 39) or the first and second countertoothing (40, 41) is present an offset (v) in the adjustment direction (46), which is a fraction of the distance (a) between successive teeth (42 to 45).

50 Claims, 11 Drawing Sheets

LOCKING DEVICE OF A STEERING COLUMN ADJUSTABLE IN AT LEAST ONE ADJUSTMENT DIRECTION

BACKGROUND OF THE INVENTION a) Field of the Invention

The invention relates to a locking device of a steering column adjustable in at least one adjustment direction, with at least one locking part, associated with the adjustment direction or one of the adjustment directions, which comprises at least one first and at least one second toothing, and at least one counterlocking part associated with this adjustment direction, which comprises at least one first and at least one second countertoothing, and with an openable and closable tensioning arrangement, in the open state of which the first and second toothings are spaced apart from the first and second countertoothings and in the closed state of which the teeth of the toothings of the locking part and of the counterlocking part engage one another, and the teeth of the toothings and of the countertoothings extend transversely to this adjustment direction and successive teeth of the toothings and of the countertoothings are each spaced apart equidistantly from one another and the tips of the teeth of the toothing and of the countertoothings are each disposed in planes.

b) Description of Related Prior Art

Adjustable steering columns are known in various implementations. Conventionally the length of the steering column as well as also its inclination or height can be changed in the open state of the locking device. To arrest the shell tube receiving the steering spindle in the closed state of the locking device, for example, packets of plates crossing one another can be provided, of which the one is secured in place on the shell tube and the other on a console part stationary on the chassis, and through which penetrates a tensioning bolt and which are mutually deadlocked by means of the tensioning arrangement. Such an adjustable steering column is disclosed for example in EP 0 802 104 B1. To permit the adjustment, in the plate packets as well as in the shell tube and in the console part intersecting elongated holes are disposed through which penetrates the tensioning bolt. One of the disadvantages in steering columns comprising locking devices with plates is that the attainable retaining forces in the closed state are restricted to friction and that for attaining as high as possible a retaining force in the closed state a relatively large number of plates is required, whereby in the open state of the locking device also a relatively high friction force must be overcome in order to adjust the steering column.

EP 0 836 981 B1 discloses further an adjustable steering column with a locking device of the type described in the introduction, in which toothed parts are provided, whose teeth engage one another in the closed state of the locking device. Adjustment of the steering column in the opened state is very smooth. However, in the case of such a locking device the problem may be encountered that the tips of the teeth of opposing toothings are directly oriented toward one another (tooth to tooth position) and strike one another when the tensioning arrangement is being closed, such that the locking device cannot be closed properly. In the event of a crash, this can lead to an uncontrolled shifting of the steering column. In addition, closing the tensioning arrangement in the event the tips of the teeth strike one another is not possible at all or incompletely or only by exerting a strongly increased force or only after a further adjustment of the steering column.

For that reason different devices have already been proposed, by means of which the striking of the tooth tips when closing the tensioning arrangement is to be prevented. For this purpose in the devices of DE 198 39 496 A1 and U.S. Pat. No. 5,787,759 A a swivellable bearing of one of the two parts comprising the tooth bars is provided. In the device of DE 39 14 608 C1 a latch element supported displaceably in the direction of the plane of the tooth engagement is provided, which furthermore is swivellable within limits about an axis parallel to the longitudinal extent of the teeth. From EP 0 796 780 A2 a guide pin is known, which is in contact on a lateral guide face on a structural part comprising the two tooth bars, and the guide pin has an inclination, which corresponds approximately to the flank inclination of the teeth. These devices are relatively elaborate in their constructions without the hazard of the tooth tips striking one another being excluded under all circumstances. On the two opposing tooth bars in the locking device of DE 198 46 292 magnets are provided and the free tips of the teeth oriented toward one another are repelled from one another by magnetic forces. In order to attain through these magnetic devices a shifting of the two structural parts in the case the tip of the teeth of the two tooth bars are in a position directly oriented toward one another, relatively high magnetic forces must be exerted, which entails considerable expenditures.

TASK AND SUMMARY OF THE INVENTION

One important task of the invention is providing a locking device of the type described in the introduction, which can be closed free of problems in every adjustment position of the steering column and which retains the steering column securely in the set position.

This is attained according to the invention through a locking device of a steering column adjustable in at least one adjustment direction, with at least one locking part, associated with the adjustment direction or one of the adjustment directions, which comprises at least one first and at least one second toothing, at least one counterlocking part associated with this adjustment direction, which comprises at least one first and at least one second countertoothing, and an openable and closable tensioning arrangement, in the open state of which the first and second toothings are spaced apart from the first and second countertoothings, and in the closed state of which the teeth of the locking part and the counterlocking part engage one another, in which the teeth of the toothings and the countertoothings extend transversely to this adjustment direction and successive teeth of the toothings and countertoothings are each spaced apart equidistantly from one another and the tips of the teeth of the toothings and countertoothings are each in planes, and in which the plane of the tips of the teeth of the first toothings and the plane of the tips of the teeth of the second toothing have a V-form position with respect to one another and form an angle, and the plane of the tips of the teeth of the first countertoothing and the plane of the tips of the teeth of the second countertoothing have a V-form position with respect to one another and form the same angle, and between the teeth of the first toothings and the teeth of the second toothing or between the teeth of the first countertoothing and the teeth of the second countertoothing there is an offset in the adjustment direction, which is a fraction of the distance between succeeding teeth.

The measures according to the invention exclude that the tips of the teeth of the first toothings and of the first countertoothing as well as also the tips of the teeth of the second toothing and the second countertoothing are simultaneously in a position directly opposite one another (head-to-head position). In all adjustment positions of the steering column in the adjustment direction associated with the locking part and counterlocking part in the closed state of the tensioning arrangement at least the teeth of one of the two toothings come to engage the teeth of the corresponding countertoothing. Thereby in particular the continuous adjustability of the steering column in the particular adjustment direction can be attained.

In an advantageous embodiment the locking device is developed in the manner according to the invention at least for the height adjustment of the steering column. It must be possible to absorb reliably in the event of a crash high forces acting in the direction of the height adjustment on the locking device. The locking part must herein be formed by a clamping plate cooperating with a tensioning bolt of the tensioning arrangement and the counterlocking part by a side facing of a console part stationary on the chassis. The tensioning bolt penetrates a cutout in a shell tube supporting the steering spindle and furthermore a cutout in the counterlocking part developed as an elongated cutout. Via this elongated hole cutout in the counterlocking part the tensioning bolt is displaceable within limits relative to the counterlocking part in the direction of the height adjustment. The clamping plate forming the locking part is disposed on the tensioning bolt which penetrates it through a bore. With an adjustment of the steering column in the direction of the height or inclination adjustment, the locking part is moved jointly with the tensioning bolt into this adjustment direction while the counterlocking part formed by the side facing is nondisplaceable into the adjustment direction as a portion of the console part stationary on the chassis. To open and close the tensioning arrangement, a manually actuatable tensioning lever can be provided or this can take place motor-driven. When closing the tensioning arrangement, the teeth of the toothings and countertoothings, which extend transversely along straight lines, preferably substantially at right angles, to this adjustment direction, are brought into engagement with one another.

Embodiment examples of the invention are also conceivable and feasible, in which locking parts and counterlocking parts developed in the manner according to the invention are utilized in connection with the length adjustment of the steering column. For example, a shell tube supporting the steering column can be supported displaceably on a guide rail and the guide rail can be supported swivellably about an axis transversely to the shell tube on the latter. A tensioning bolt of a tensioning arrangement penetrates here an elongated hole extending in the direction of the length adjustment in the shell tube and bears at its end within the shell tube a clamping plate. Such a construction is known for example from EP 0 836 981 B1. The clamping plate supported by the tensioning bolt and disposed within the shell tube could in this case form the locking part and comprise the first and second toothing, and the counterlocking part could be disposed on the inside of the shell tube or be formed by a section of the shell tube and comprise the first and second countertoothings cooperating with the first and second toothings. Arresting the height adjustment could also take place in such a construction in the manner according to the invention.

To permit transverse displacements (in the direction perpendicular to the adjustment direction and perpendicular to the direction of closure, into which the locking part is displaced when opening and closing the tensioning arrangement) between the locking part and the counterlocking part, which may occur when closing the tensioning arrangement as a function of the adjustment position, as will still be explained in further detail in connection with the description of the figures, sufficient tolerance between the locking part and the counterlocking part can be provided or the toothings and/or countertoothings are displaceably disposed on the locking part or counterlocking part.

BRIEF DESCRIPTION OF THE DRAWING

Further advantages and details of the invention will be explained in the following in conjunction with an embodiment example depicted in the attached drawing, on the basis of which further tasks of the invention are also evident. In the drawing depict.

DESCRIPTION OF PREFERRED EMBODIMENT EXAMPLES

The embodiment example of a steering column depicted in the figures comprises in conventional manner a steering spindle 1, which is at least sectionally received in a shell tube 2 and is rotatable relative to it. The shell tube 2 is adjustable within limits relative to a console part 3. The steering spindle 1 in the depicted embodiment example is length-adjustable as well as height- and inclination-adjustable. For the length adjustment the steering spindle 1 comprises in conventional manner two telescopable sectionals 4, 5. In the height adjustment a swivelling of the steering spindle 1 and of the shell tube 2 takes place about a pivot axis 6 and simultaneously with the height adjustment of the steering spindle 1 in the proximity of its front end, at which a steering wheel is attached, an inclination adjustment takes place of the longitudinal axis 8 of the steering spindle disposed in the proximity of the front end 7. The pivot axis 6 can be formed thereby that for example a part is provided which accepts the steering spindle 1 rotatably and annularly encompassing it, which part comprises bolts projecting bilaterally, which are rotatably accepted in brackets 9 of the console part 3. Adjoining sectional 5 of the steering spindle 1 is a universal joint 10 and a further sectional 11 of the steering spindle, which is only partially shown in the figures. The parts of the steering spindle not shown can be developed in conventional manner.

The console part 3 comprises a mounting part 12 for the securement on the chassis of a motor vehicle. On the mounting part 12 is held a carrier plate 13, which can be rigidly connected with the mounting part. But the carrier plate 13 can be clamped in the mounting part 12 in defined manner, such that in the event of a crash a displacement of the carrier plate 13 in the axial direction of the steering spindle relative to the mounting part 12 is possible, as is already known for conventional steering columns. But during normal operation there is a nondisplaceable connection between the carrier plate 13 and the mounting part 12.

On the carrier plate 13 are attached side facings which extend laterally to the shell tube 2 and which, in the embodiment example shown, form counterlocking parts 14, 15 of the locking device described in the following.

The locking device comprises a tensioning arrangement, which in the depicted embodiment example can be opened and closed via a manually actuatable tensioning lever 16. When the tensioning lever 16 is swivelled a cam disk 18, rotatably supported on a tensioning bolt 17, is swivelled about the axis 19 of the tensioning bolt 17. On the tensioning bolt 17 is further disposed a locking part 21, through a bore of which penetrates tensioning bolt 17. On the side facing the cam disk 18 the locking part 20 has oblique faces 22, which cooperate with cams 23 of the cam disk 18. The tensioning bolt penetrates further an elongated hole 24, extending perpendicularly to the longitudinal axis 8 of the steering spindle 1 in the direction of the height adjustment, in the counterlocking part 14, an elongated hole 26, extending in the direction of the longitudinal axis 8, in the shell tube 2 and an elongated hole 25, extending in the direction of the height adjustment, in the counterlocking part 15. On the segment, projecting from the counter locking part 15, of the tensioning bolt 17 is further disposed a clamping plate through which penetrates a tensioning bolt 17 through a bore 27 and which forms a further locking part 21. The cam disk 18 and the locking part 21 are stayed against the head 28 of the tensioning bolt 17 on their side faces facing away from the steering spindle 1, on the one hand, and on a nut 29 screwed onto the opposite end of the tensioning bolt 17 provided with threading or onto an axial bearing 30 disposed between them.

Figure 1:
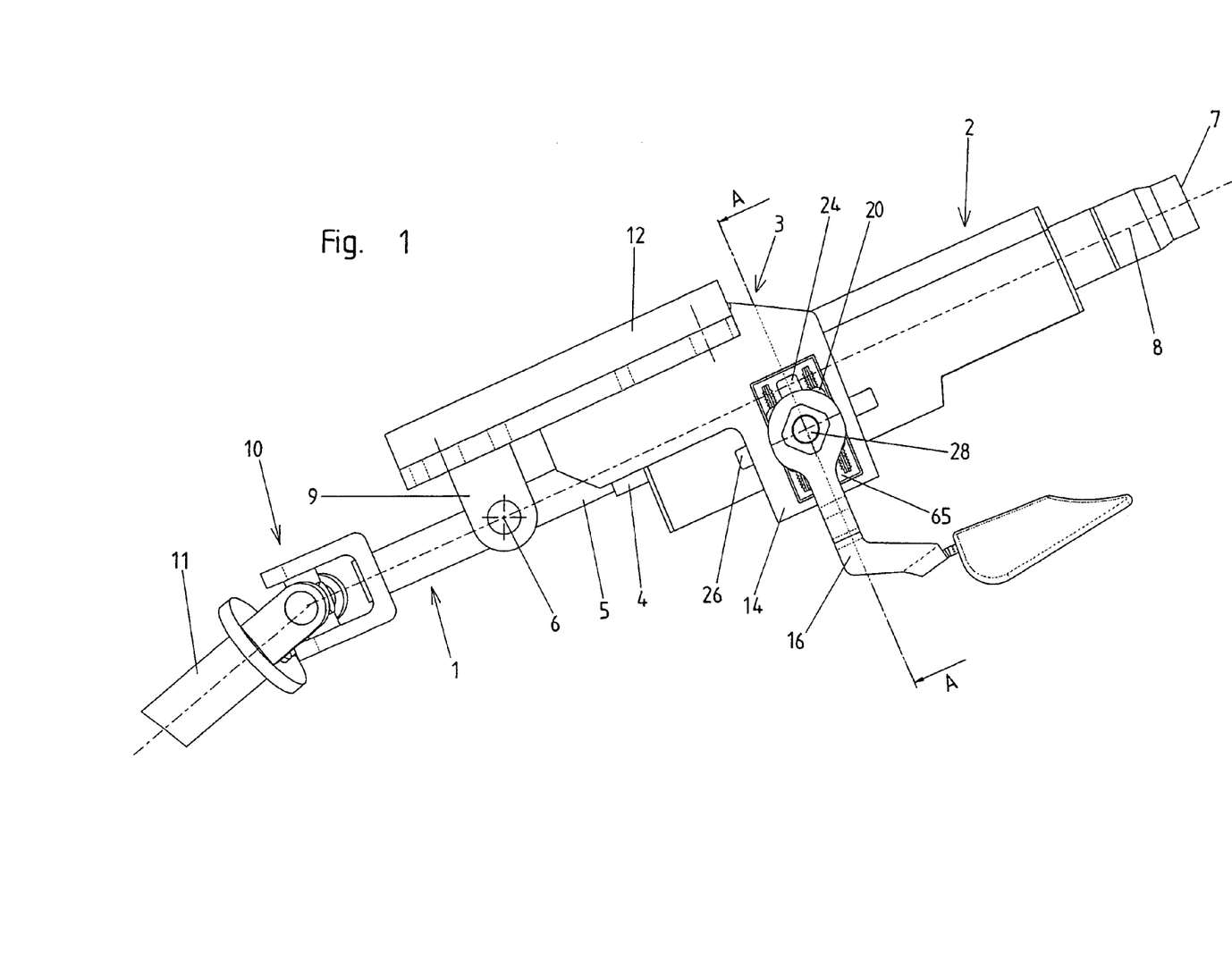
FIG. 1 a side view of an embodiment example of a steering column with a locking device according to the invention, FIG. 2 a side view of the steering column of FIG. 1 viewed from the opposite side, FIG. 3 a top view of the steering column, FIG. 4 a perspective representation, partially in the manner of an exploded representation drawn apart, FIG. 5 a section along line AA of FIG. 1, FIG. 6 a section through a portion of the steering column along line BB of FIG. 2, in the closed state FIG. 7 a section along line CC of FIG. 6, FIG. 8 a section corresponding to FIG. 6, in a slightly different adjustment position of the steering column, FIG. 9 a section along line DD of FIG. 8, FIG. 10 a perspective representation of segments of the locking part and of the counterlocking part, in the opened state of the locking device, FIG. 11 a side view of the parts of FIG. 10, FIG. 12 a top view onto the counterlocking part viewed in the direction E in FIG. 11, FIG. 13 a representation corresponding to that of FIG. 10 in the closed state of the locking device, FIG. 14 a side view corresponding to that of FIG. 11 in the closed state of the locking device, FIG. 15 a section along line FF of FIG. 14, FIGS. 16 to 18 and 19 to 21 are representations corresponding to those of FIG. 13 to 15 in two adjustment positions of the steering column with minor changes compared to FIG. 13 (FIGS. 18 and 21 are sections along lines GG and HH of FIGS. 17 and 20)
Figure 2:
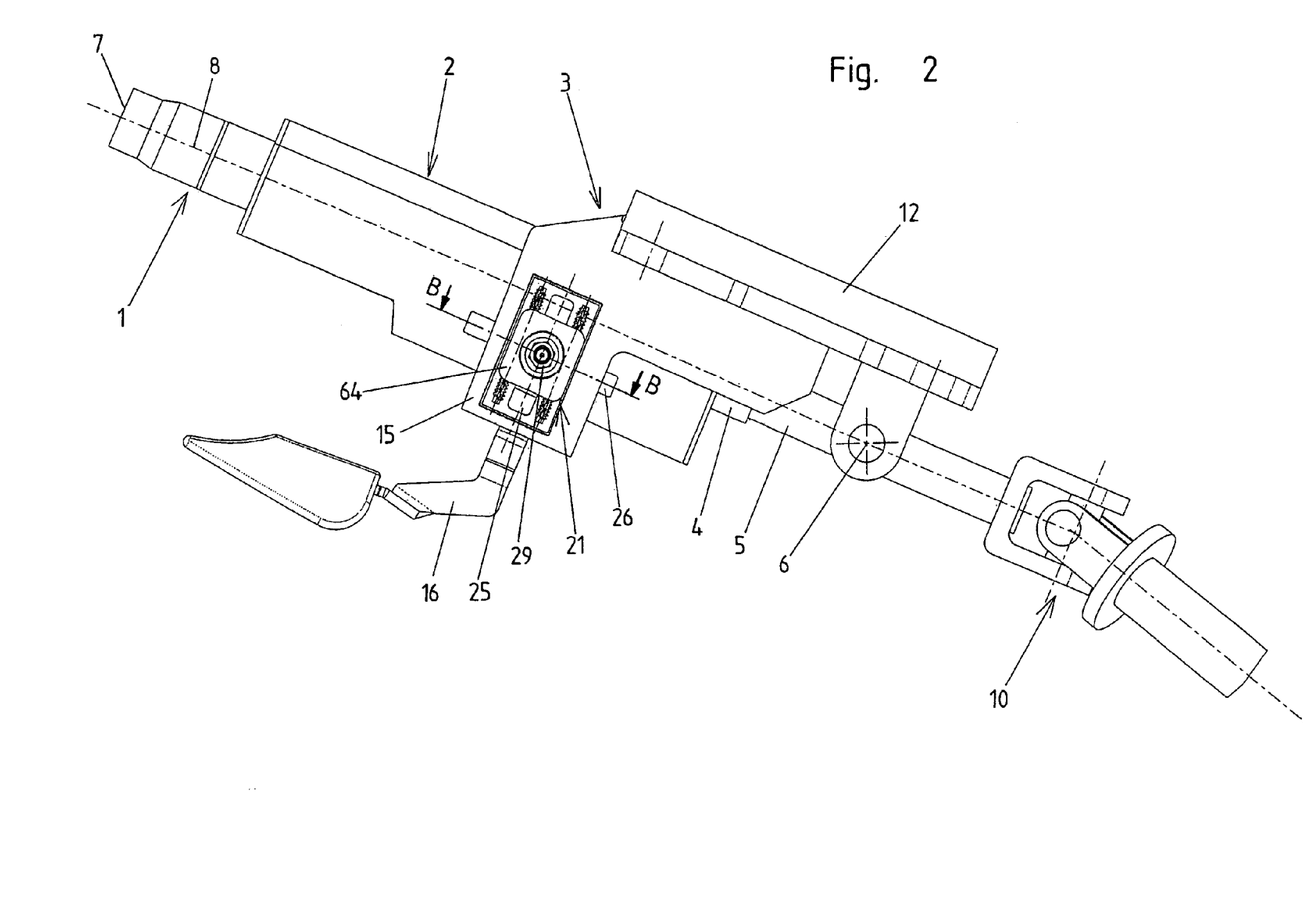
Figure 3:
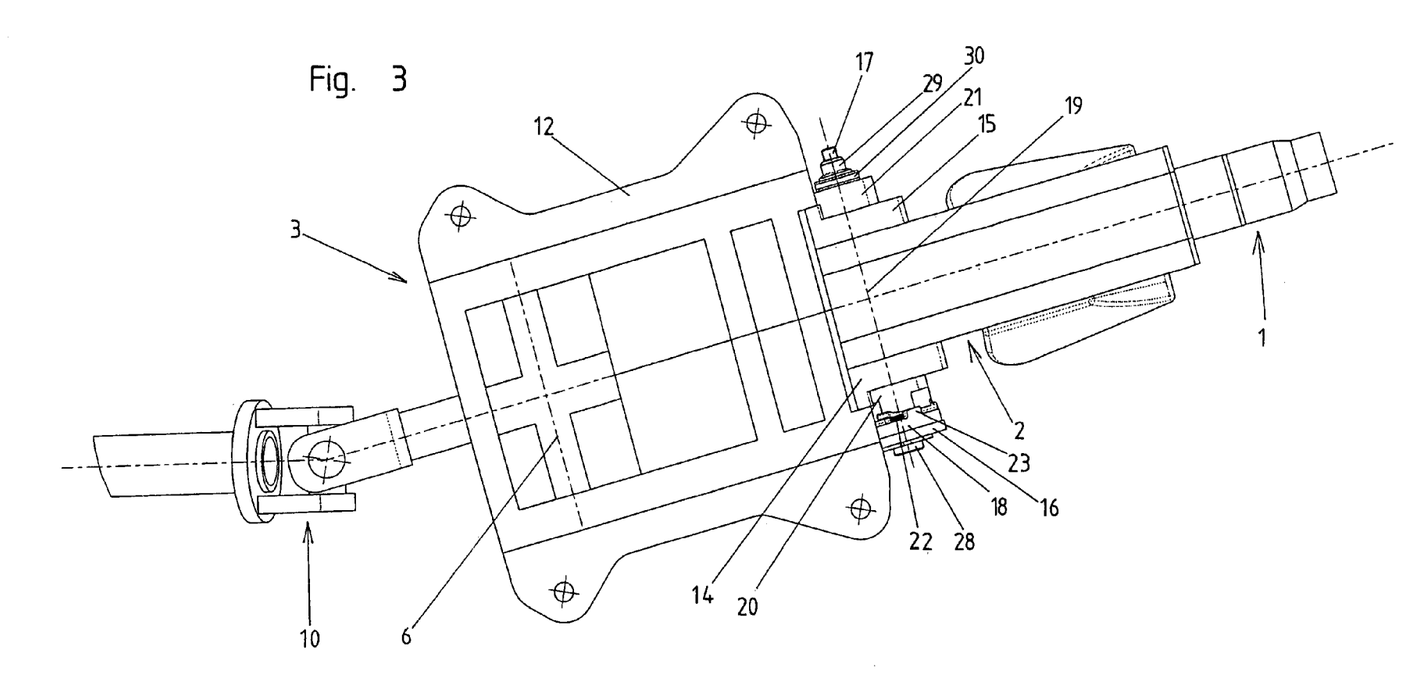
Figure 4:
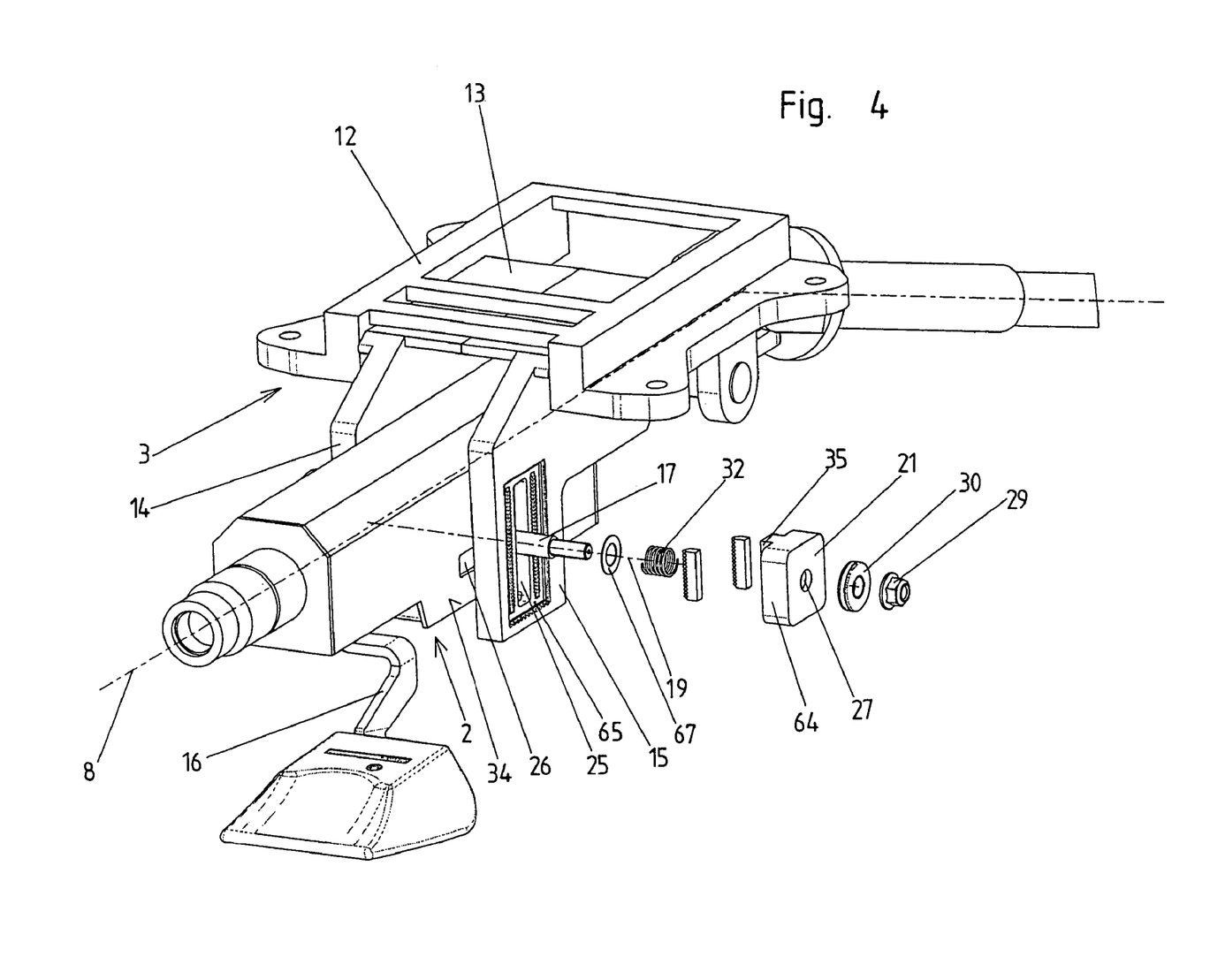
Figure 5:
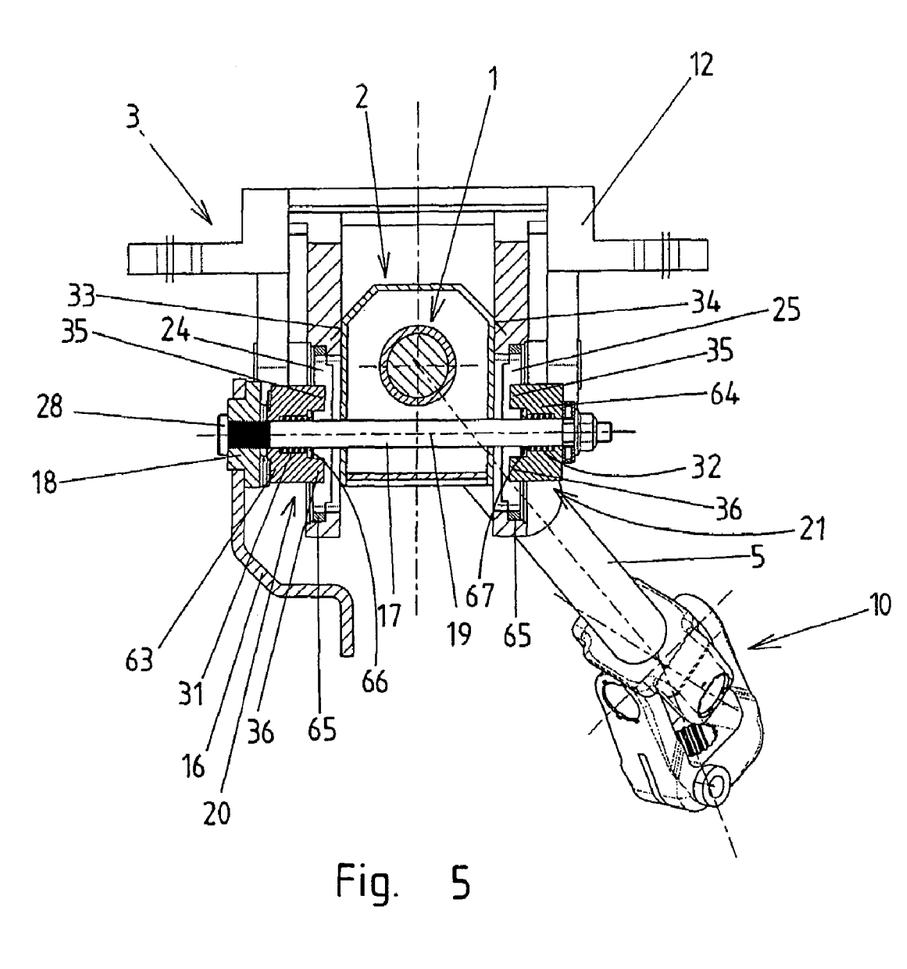
Figure 6:
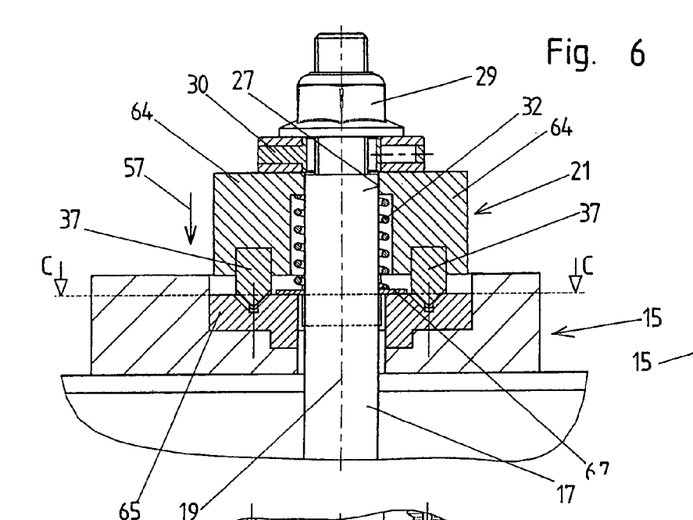
Figure 7:
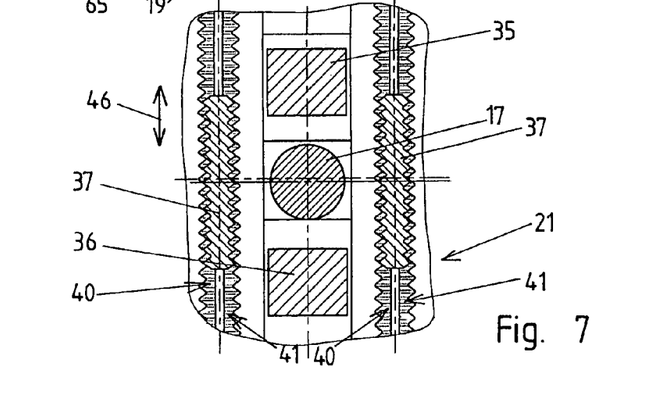
Figure 8:
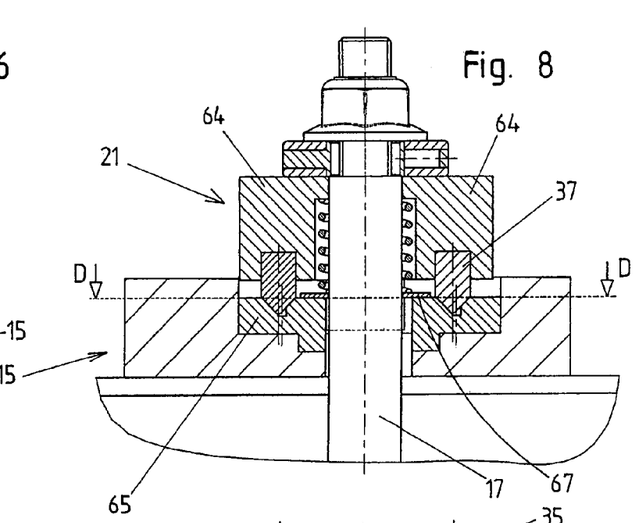
Figure 9:
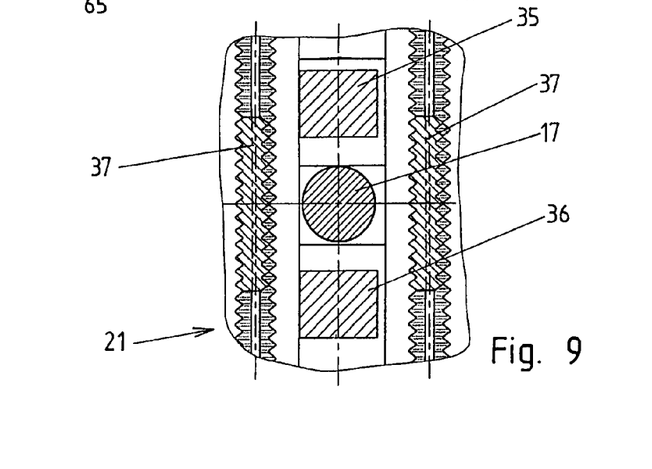
Figure 10:
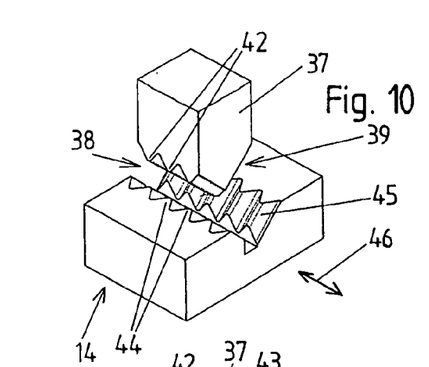

By swivelling the tensioning lever 16 during the closing of the tensioning arrangement the locking parts 20, 21 are moved into the particular closure direction 57 (FIG. 6) and pressed against the counterlocking parts 14, 15, during the opening of the tensioning arrangement the locking parts 20, 21 are raised counter to the closure direction 57 from the counterlocking parts 14, 15, for the purpose of which springs 31, 32 are disposed between these parts, which, on the one hand, are stayed on the locking parts 20, 21, on the other hand, on slide disks 66, 67 in contact on the counterlocking parts 14, 15. Due to the pressing of the locking parts 20, 21 onto the counterlocking parts 14, 15 during the closing of the tensioning arrangement, the height or inclination adjustment of the steering column is arrested in the adjusted position. Furthermore, during the closing of the tensioning arrangement, due to the force acting onto the counterlocking parts 14, 15, these are pressed with their side faces opposing the locking parts 20, 21 against the side faces 33, 34 of the shell tube 2, whereby additionally the length adjustment of the steering column in this embodiment example is arrested under frictional closure in the set position (and therein also a frictional force acting against a height adjustment is exerted).

The locking parts 20, 21 are secured opposite to the counterlocking parts 14, 15 against swivelling about the axis of the tensioning bolt 17. For this purpose, the locking parts 20, 21 in the depicted embodiment example comprise on both sides of the tensioning bolt 17, penetrating through its bores 27, noses 35, 36, which project into the elongated holes 24, 25 of the counterlocking parts 14, 15, in order to serve in the opened state of the tensioning arrangement or during closing of the tensioning arrangement as a guide between the locking parts 20, 21 and the counterlocking parts 14, 15.

On the side facing the associated counterlocking part 14, 15 the locking parts 20, 21 are provided with tooth bars 37. In the embodiment example shown the tooth bars are set into recesses of base bodies 63, 64 of the locking parts 20, 21 and are rigidly connected with the base bodies 63, 64. Forming the tooth bars 37 integrally with the base bodies 63, 64 would also be conceivable and possible.

Each tooth bar 37 has a first and a second toothing 38, 39, and the first toothings 38 cooperate with first countertoothings 40 and the second toothings 39 with second countertoothings 41 of the counterlocking parts 14, 15. In FIG. 10 to 21 a segment is shown with a tooth bar 37 with the segments disposed thereon, of the toothings 38, 39 as well as a segment of a counterlocking part 14 cooperating with segments of the countertoothings 40, 41 (which are disposed for example on insert parts 65 of the counterlocking parts 14, 15). The toothings 38, 39 and countertoothings 40, 41 have each a number of teeth 42 to 45, all of which extend transversely to the adjustment direction 46, indicated in FIGS. 10 and 12 by double arrows, in this case of the height adjustment. The tips of the teeth extend along straight lines transversely to the adjustment direction, preferably perpendicularly to the adjustment direction 46. The straight lines, along which the tips of teeth 42 to 45 extend, are here for all teeth of a particular toothing 38, 39 and a particular countertoothing 40, 41 parallel to one another. In the depicted embodiment example these straight lines, further, are for teeth 42 of the first toothing parallel to the teeth 44 of the first countertoothing and for the teeth 43 of the second toothing parallel to the teeth of the second countertoothing, and this applies in the closed as well as also in the opened state of the tensioning arrangement The teeth 42 to 45 have all the same distances a from one another and these distances a are to be measured, for example, between the tips of adjacent teeth.

The tips of teeth 42 of the first toothing 38 are in a common plane 47, the tips of teeth 43 of the second toothing are likewise in a common plane 48. The tips of teeth 44 of the first countertoothing 40 are in a common plane 49 and the tips of teeth 45 of the second countertoothing 41 are in a common plane 50. Plane 47 of the tips of teeth 42 of the first toothing 38 and the plane 48 of the tips of teeth 43 of the second toothing 39 form with each other a V and form an angle 51. In the depicted embodiment example the first toothing 38 together with the second toothing 39 form a type of arrow toothing. Plane 49 of the tips of teeth 44 of the first countertoothing 40 and the plane 50 of teeth 45 of the second countertoothing 41 are also disposed in the form of a V with respect to one another and form the same angle 51. The plane 47 associated with the first toothing 38 is parallel to the plane 49 associated with the first countertoothing 48 associated with the second toothing 39 parallel to the plane 50 associated with the second countertoothing 41. The countertoothings 40, 41 are disposed in a substantially, seen in cross section or in side view (FIG. 11), V-form recess in the counterlocking part 14.

Figures 11, 12, 14, 15, 17, 18:
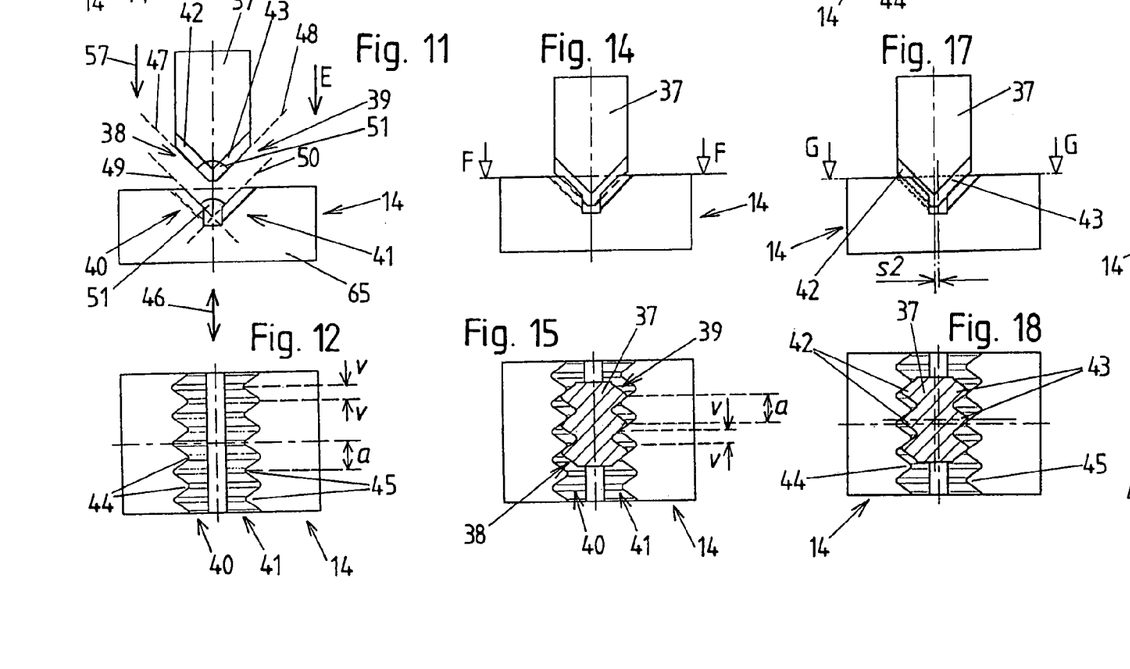
Figures 20, 21:
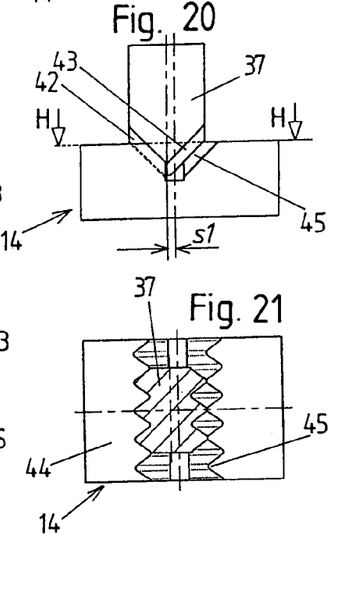

In the embodiment example according to FIG. 1 to 21, between teeth 42 of the first toothing 38 and teeth 43 of the toothing 39 no offset exists in the adjustment direction 46 as is evident in particular in the sections according to FIG. 15, 18 and 21. This means, the tips of teeth 42 and 43 lie at the same sites with respect to an axis extending parallel to the adjustment direction 46 or, expressed differently, for a particular tip of a tooth 42 of the first toothings 38 there is a straight connection line extending to the tip of a tooth 43 of the second toothing 39, which line is perpendicular to the adjustment direction 46.

On the other hand, between the teeth 44 of the first countertoothing 40 and the teeth 45 of the second countertoothing 41, seen in the adjustment direction, there is an offset v, i.e. the tips of these teeth are not at the same sites with respect to an axis extending parallel to the adjustment direction 46. The offset v between teeth 44 of the first countertoothing 40 and teeth 45 of the second countertoothing 41 in this embodiment example is only one half of the distance between two successive teeth 44 and 45. It could be said that the first and the second countertoothing 40, 41 are phase-shifted with respect to one another, and in this embodiment example, phase-shifted by 90° (corresponding to one half tooth), while teeth 42, 43 of the first and second toothing 38, 39 have the same phase position.

As a consequence, teeth 42, 44 of the first toothing 38 and first countertoothing 40 cannot simultaneously assume a head-to-head position with teeth 43, 35 of the second toothings 39 and second countertoothing, as is evident for example in FIG. 21. The tips of teeth 43 of the second toothing 39 are here precisely opposite the tips of teeth 45 of the second countertoothing 41, while the tips of teeth 42 of the first toothing 38 are opposite the valleys between the teeth 44 of the first countertoothing 40. If the tensioning arrangement in this adjustment position of the steering column is closed, the head-to-head position of teeth 43 of the second toothing 39 relative to the teeth 45 of the second countertoothing 41 continues (on the right in FIG. 21), but the teeth 42 of the first toothing 38 become completely engaged with the teeth 44 of the first countertoothing 40 (on the right side in FIG. 21). Herein the tooth bar 37 is displaced to the left relative to the center position between the first and second countertoothing 40, 41 by a distance s1. This position of the tooth bar 37 is automatically assumed when the tensioning arrangement is closed, since there is overall sufficient tolerance between the tensioning bolt 17 and the counterlocking part 14 and between the tensioning bolt 17 and the locking part 20 and 21.

Figures 13, 16:
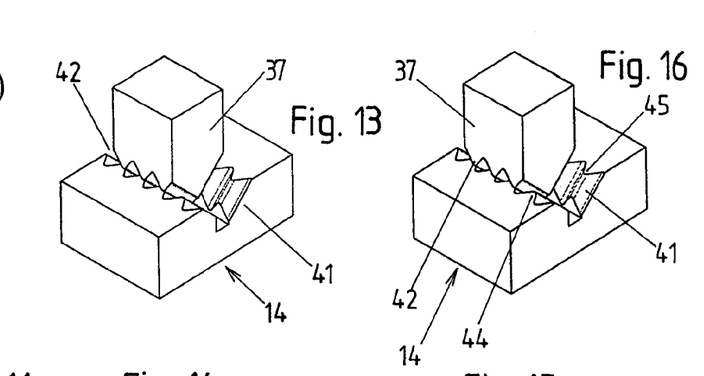
Figure 19:
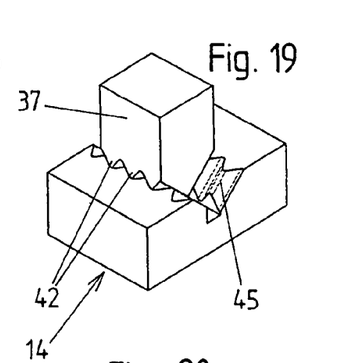

Somewhat different adjustment positions of the steering column, in which the tensioning arrangement has been closed, are depicted in FIG. 13 to 15 and 16 to 18. In FIG. 13 to 15 a center position is evident between head-to-head positions on both sides, and the tooth bar 37 is not offset relative to the center position between the countertoothings 40, 41, and in FIG. 16 to 18 an intermediate position between the positions of FIG. 19 to 21 and 13 and 15 is shown, and the lateral offset of the tooth bar 37 relative to the center position between the countertoothings 40, 41 has a smaller distance s2 (one half of s1) compared to FIG. 20.

In this way the continuous adjustment and locking of the steering spindle in the adjustment direction associated with toothings 38, 39 and countertoothings 40, 41 is possible.

Two somewhat different adjustment positions of the steering spindle 1 in the closed state of the tensioning arrangement are also evident in FIG. 6 to 9. In this embodiment example of the invention the first and second countertoothings 40, 41 are disposed on insert parts 65 of the counterlocking part 15 (or 14). The tooth positions between the toothings 38, 39 and countertoothings 40, 41 are in this embodiment example identical on both sides of the tensioning bolt 17 (left and right of the tensioning bolt in FIGS. 6 and 8).

Although in the depicted embodiment example on both sides of the steering spindle 1 one locking part 20, 21 and associated counterlocking part 14, 15 are provided, it would also be conceivable and possible to provide only one locking part 20 or 21 with associated counterlocking part 14 or 15 on one side of the steering spindle 1. Furthermore, the function according to the invention could in principle also be attained with only one tooth bar 37 on the locking part 20 or 21, whose toothings 38, 39 cooperate with countertoothings 40, 41 in the counterlocking part 14 or 15. On the side of the locking part 20 or 21, which is opposite the tensioning bolt 17, could in this case be disposed for the staying between the locking part 20 or 21 and counterlocking part 14 or 15 a slide element sliding on the surface of the counterlocking part 14 or 15 could be disposed on the locking part 20 or 21. It would furthermore be conceivable and possible to dispose on the locking part 20 or 21 the first toothing 38 and on the counterlocking part 14 or 15 the first countertoothing 40 cooperating with it on one side with respect to the tensioning bolt 17 or of elongated hole 24 or 25 and the second toothing 39 as well as the associated second countertoothing 41 on the other side with respect to the tensioning bolt 17 or of the elongated hole 24 or 25.

Instead of developing the toothings 38, 39 such that they project beyond the locking part 20 or 21 and the countertoothings 40, 41 developed such that they are recessed relative to the surface of the counterlocking part 14 or 15, this could also be reversed, thus, for example, the first and second countertoothing 40, 41 could be developed as an arrow toothing on the counterlocking part 14 or 15. Mixtures thereof would in principle also be conceivable and possible.

Instead of the described tensioning arrangement, the latter could also be developed in a different manner, as long as locking part 20, 21 and counterlocking part 14, 15 in the open state of the tensioning arrangement are spaced apart from one another and in the closed state of the tensioning arrangement are tensioned with one another. Different tensioning arrangements have become known in connection with steering columns, which might be utilizable for this purpose.

As already stated, the invention is not limited to the arresting of the height or inclination adjustment of the steering column, but rather, instead of or additionally, the invention could also be utilized in connection with arresting the length adjustment of a steering column.

For arresting the height or inclination adjustment in steering columns, in which the pivot axis 6 is significantly closer to the tensioning bolt 17 (so-called "head tilt steering columns") the invention can be used advantageously. Herein the tooth bars 37 with the toothings 38, 39 as well as the countertoothings 40, 41 could also be developed such that they are curved in the form of a circular arc (with the pivot axis 6) as center point.

Figure 22:
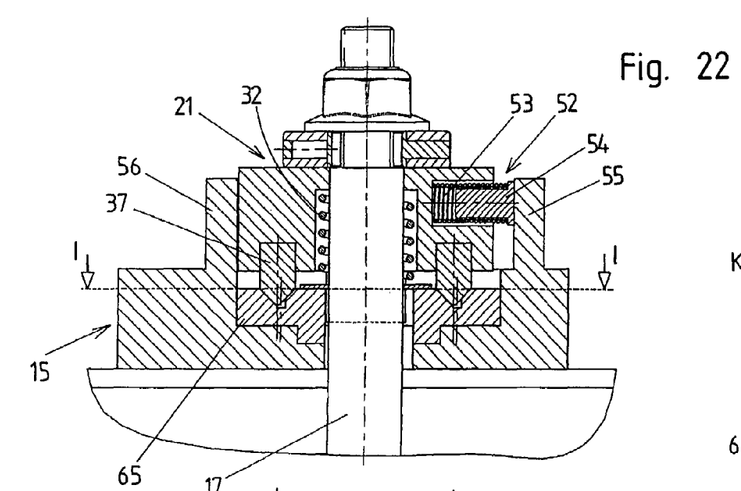
FIGS. 22 and 23 are representations corresponding to those of FIGS. 6 and 7 of a minimally modified embodiment example (FIG. 23 is a section along line II of FIG. 22)
Figure 23:
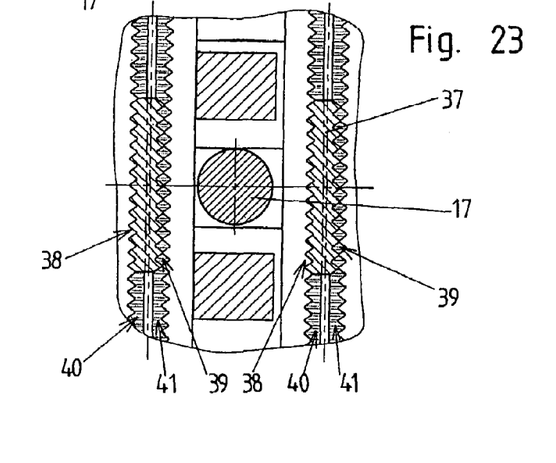

In the embodiment variants of the invention depicted in FIGS. 22 and 23 a spring device 52 acts between the locking part 20 or 21 and the counterlocking part 14, 15. This spring device 52 is formed by a spring 53 disposed in a recess of the locking part 20, 21, which supports a slide bolt 54, stayed against an extension 55 of the counterlocking part 14, 15 overlapping the locking part 20, 21 developed with low surface friction. On the opposite side of the locking part 20, 21 a further guide extension 56 overlapping the locking part 20, 21 is disposed, on which the locking part 20, 21 slides during the adjustment and also slides during the opening and closing of the tensioning arrangement. Thereby, independently of the adjustment position before the closing of the tensioning arrangement, a clamped position is to be attained, in which the toothings on the one side completely engage the countertoothings, as is shown in FIG. 23.

Figure 24:
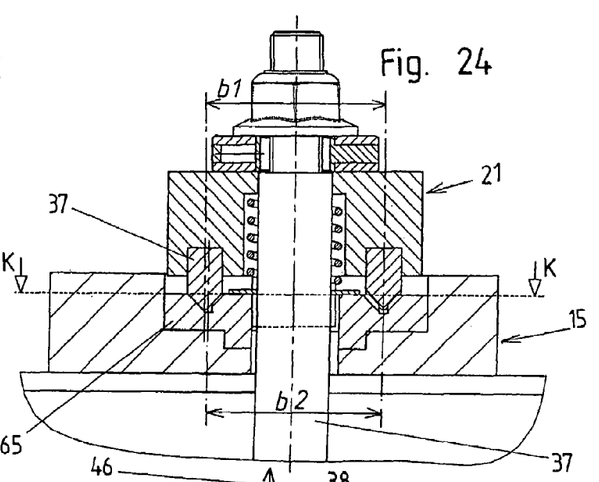
FIGS. 24 and 25 are representations corresponding to those FIGS. 6 and 7 of a further minimally modified embodiment example (FIG. 25 is a section along line KK of FIG. 24)
Figure 25:
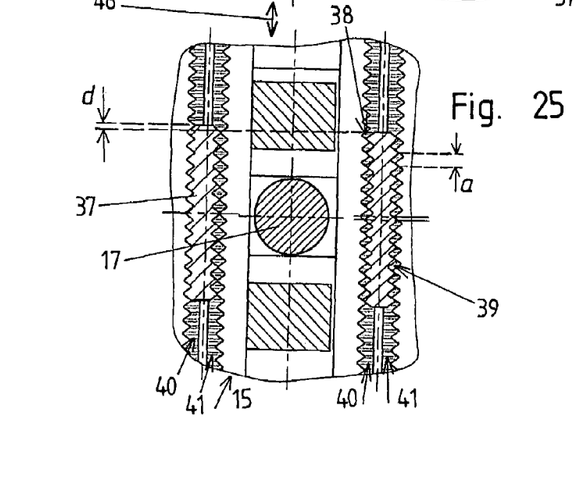
Figure 26:
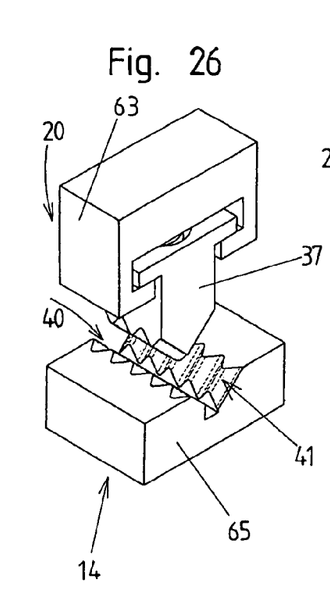
FIG. 26 is a representation corresponding to that of FIG. 10 of a further modified embodiment example, FIG. 27 a section through the parts of FIG. 26 (section plane parallel to the longitudinal extent of the teeth), FIG. 28 a section along line LL of FIG. 27, FIG. 29 a representation corresponding to that of FIG. 16 in the closed state of the locking device, FIG. 30 a representation corresponding to that of FIG. 27 in the closed state of the locking device, FIG. 31 a section along line MM of FIG. 30, FIG. 32 a representation corresponding to that of FIG. 10 of a further modified embodiment of the invention, FIG. 33 a side view of the parts of FIG. 32, FIG. 34 a section along line NN of FIG. 33, FIG. 35 a representation corresponding to that of FIG. 32 but in the closed state of the locking device, FIG. 36 a side view of the parts of FIG. 35, FIG. 37 a section along line OO of FIG. 36, FIGS. 38 and 39 representations corresponding to that of FIG. 6 of a further embodiment example of the invention in the closed and open state of the tensioning arrangement, FIG. 40 a section along line PP of FIG. 38.

A further embodiment variant of the invention is shown in FIG. 24 to 25. Here the toothings 38, 39 and countertoothings 40, 41 are developed identically on both sides of the tensioning bolt 17. But the first toothing 38 and second toothing 39 on the one side (left in FIG. 24) with respect to the tensioning bolt 17 are offset relative to the first toothing 38 and second toothing 39 on the other side (right in FIG. 24) with respect to the tensioning bolt in the adjustment direction 46 by an amount d, which corresponds to a fraction of the distance a between successive teeth, for example to half the distance between successive teeth. In the depicted embodiment example according to FIGS. 24 and 25 this is attained for example thereby that the two tooth bars 37 are displaced relative to one another by the amount d in the adjustment direction 46. Furthermore, the distance b1 between the center planes between the first and second toothings 38, 39 is different relative to the distance b2 between the center planes between the first and second counter toothings 40, 41. In this way it is possible to attain that a head-to-head position of one of the two toothings 38, 39 with one of the two countertoothings 40, 41 can always only be present simultaneously on one side of the tensioning bolt 17, whereby the reliability of the arresting of the adjustment is again further increased (a zigzag form slipping between the tooth bars 37 and the counter toothings 40, 41 is blocked). Instead of the offset of the toothings 38, 39 it would also be possible that the countertoothings 40, 41 are offset (or in addition to it).

Figure 29:
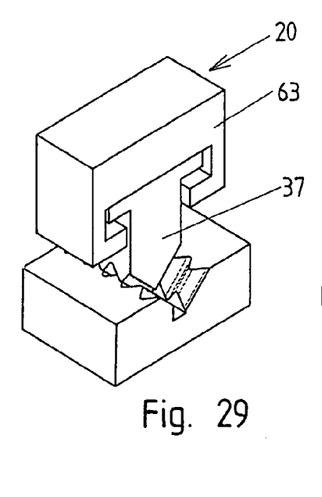
Figure 30:
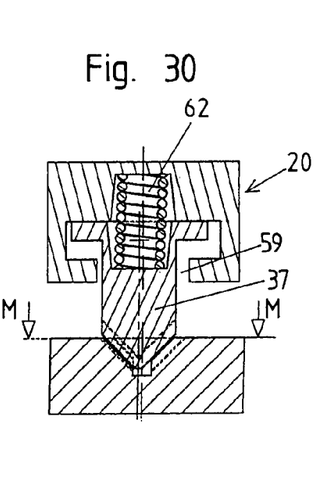
Figure 31:
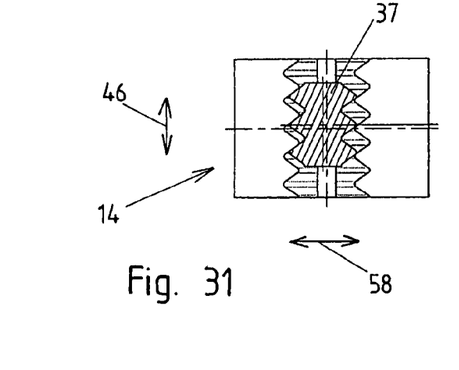
Figures 32, 33:
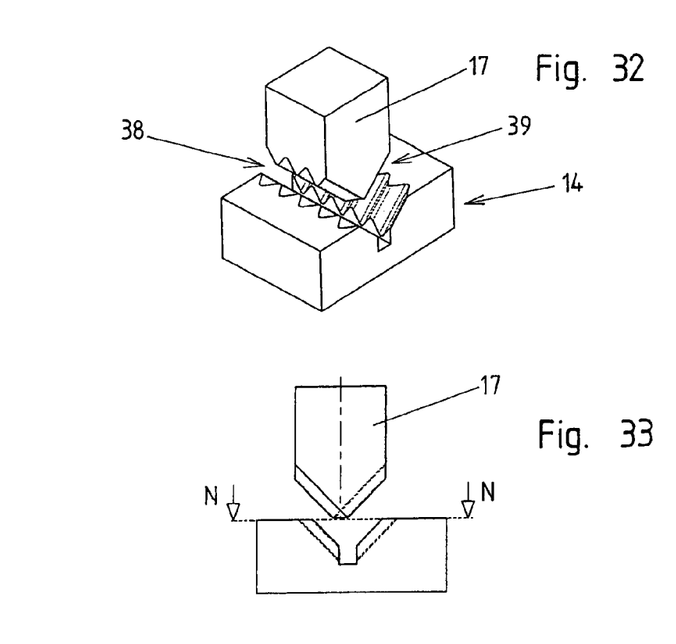
Figure 34:
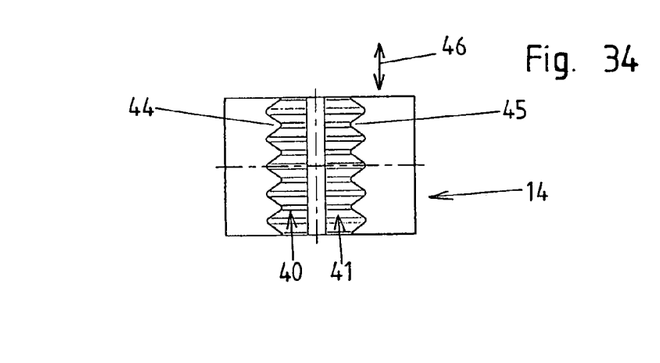
Figures 35, 36:
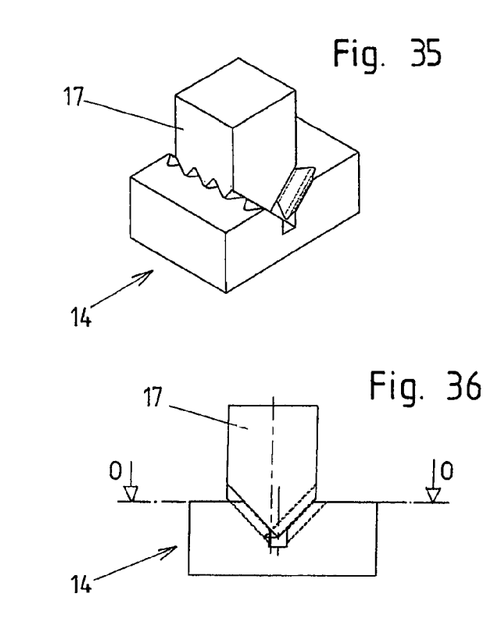
Figure 37:
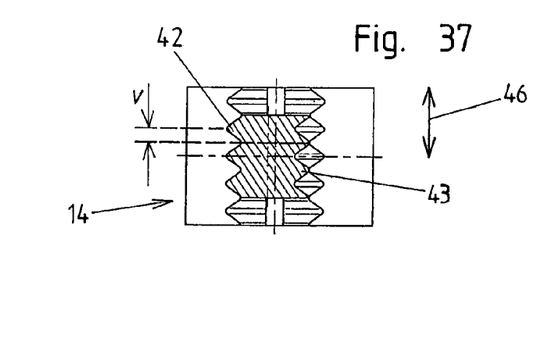

FIG. 26 to 31 show an embodiment example of the invention, in which a particular tooth bar 37 is supported displaceably relative to the locking part 20 in the closure direction 57 as well as also in the direction 58 perpendicular to the adjustment direction 46 and the closure direction 57. The base body 63 comprises an undercut groove 59, into which projects the ("floatingly supported") tooth bar 37 supported with tolerance relative to the undercut groove 59, and on the tooth bar 37 are disposed lateral stop extensions 60, 61, which project into the undercut regions of the groove 59. A spring device 62 preloads the tooth bar 37 into the completely extended position, in which the stop extensions 60, 61 are in contact on the undercutting flanks of groove 59. When closing the tensioning arrangement, the tooth bar 37 is pressed against the force of the spring 62 with its stop extensions 60, 61 onto the bottom of the groove and can herein be displaced in adaptation to the countertoothings 40, 41 in the direction 58. An example of a completely closed state is shown in FIG. 29 to 31. Due to this development of the locking part 20 it is not necessary for the displacement, required during the closing of the tensioning arrangement depending on the adjustment position between the toothings 38, 39 and the countertoothings 40, 41 in the direction 58, that a correspondingly large tolerance exists between the locking part 20 and the tensioning bolt 17 and/or between the tensioning bolt 17 and the counterlocking part 14.

Figure 27:
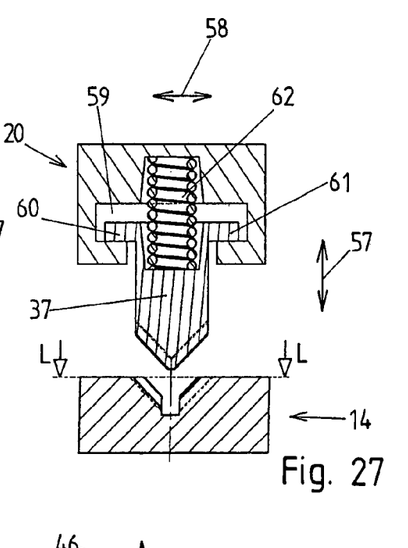
Figure 28:
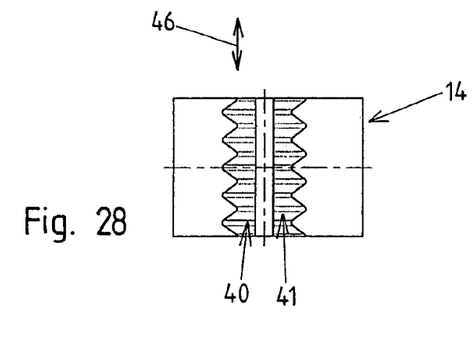

It would also be conceivable and possible to support the tooth bar 37 swivellable relative to the base body about an axis parallel to the adjustment direction 46, in order to make possible during the closure of the tensioning arrangement the adjustment of the toothings 38, 39 in the direction 58 (FIG. 27). The toothings 38, 39 or the tooth bars 37 and the countertoothings 40, 41 could also be developed such that they have curvature.

FIG. 32 to 37 lastly show an embodiment example, in which the offset v in the adjustment direction 46 between the teeth is not present between the first and second countertoothing 40, 41 but between the first and second toothing 38, 39.

Figures 38, 39, 40:
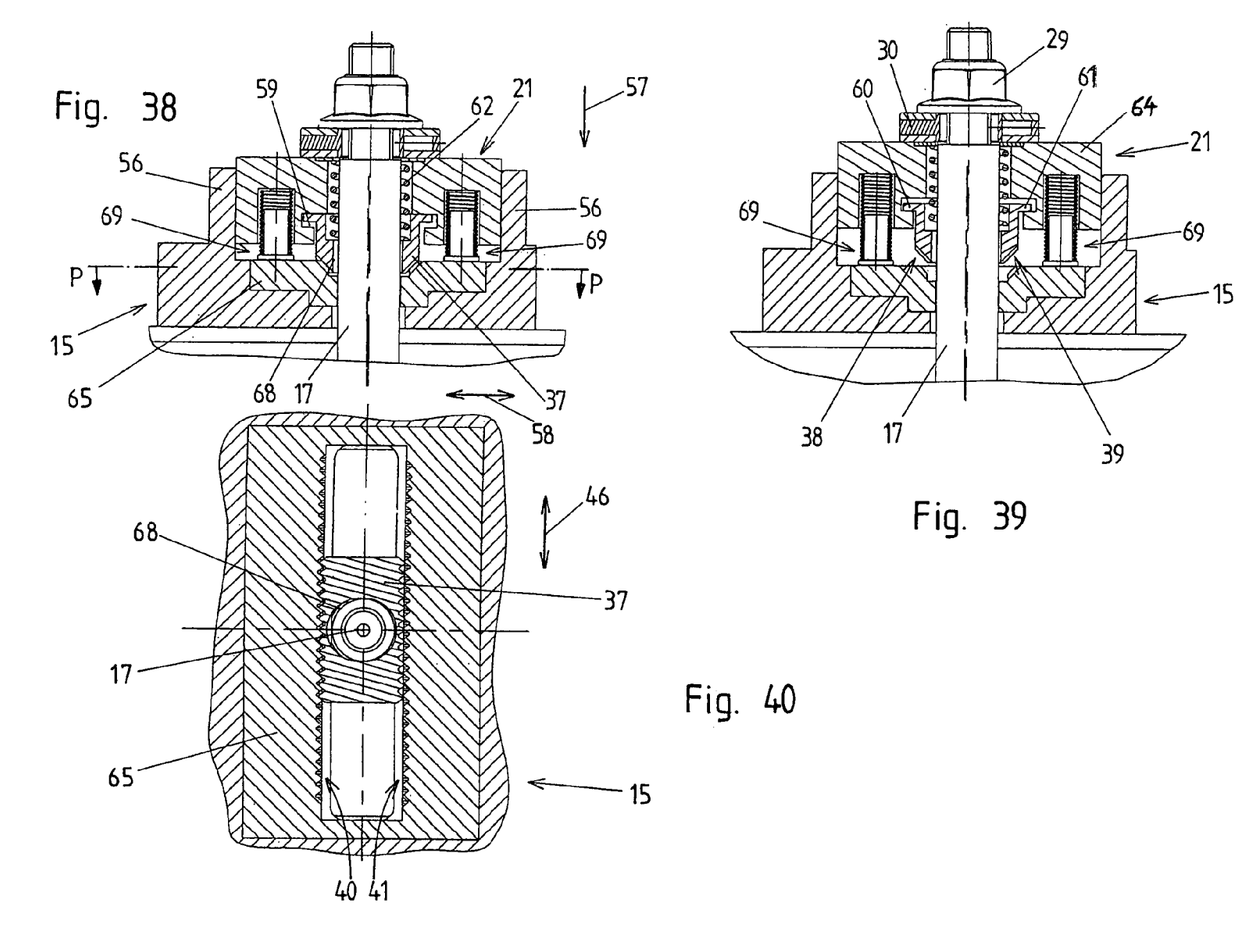

A further embodiment example of the invention is depicted in FIGS. 38 and 40. Here a tooth bar 37 is provided, which has a penetration opening 68 for the penetration of the tensioning bolt 17, which is here developed as an elongated cutout in order to make possible the adjustment of the tooth bar 37 in the direction 58 perpendicularly to the closure direction 57 and to the adjustment direction 46. As in the embodiment example according to FIG. 26 to 31, the tooth bar 37 is supported "floatingly" in an undercut groove 59 of the locking part 21, i.e. it has tolerance in the direction 58. It is further displaceable parallel to the closure direction 57 relative to the base body 64 of the locking part 21. A spring device 62 preloads the tooth bar 37 outwardly and in the open state of the tensioning arrangement, the stop extensions 60, 61 are in contact on the undercut flanks (FIG. 39).

On the tooth bar 37, again, first and second toothings. 38, 39 are disposed, which in this embodiment example are disposed on sides of the tooth bar 37, opposite with respect to the tensioning bolt 17, (left and right of tensioning bolt 17 in FIG. 38 to 40). The toothings 38, 39 again cooperate in the manner previously described with countertoothings 40, 41, which are disposed on the counterlocking part 15, and here specifically on an insert part 65. The countertoothings 40, 41 are, corresponding to the toothings 38, 39, disposed on sides opposite with respect to the tensioning bolt 17, of the counterlocking part 15.

To guide the locking part 21 relative to the counterlocking part 15, the latter comprises guide extensions 56, between which the locking part 21 is located and which displaceably guides the locking part in the adjustment direction 46. To space the locking part 21 apart from the counterlocking part 15, spring devices 69 are provided, which are each formed by a spring stayed on the locking part 21 and a slide bolt stayed on the counterlocking part 15 (on the surface of the insert part 65).

This embodiment example according to FIG. 38 to 40 could be modified to the extent, for example, that the tooth bar 37 is rigidly connected with the locking part 21, and the locking part 21 has sufficient tolerance relative to counterlocking part 15 in direction 58 in order to make possible setting the tooth bar 37 relative to the counterlocking part 15 in this direction.

The locking parts 20, 21 could, for example, be formed by machining or as sintered parts or of stamped sheet steel by noncutting deep-drawing methods. The same applies to the counterlocking parts or the insert parts disposed therein comprising the countertoothings. The insert parts 65 can also be omitted and the counterlocking parts can be integrally developed.

Different further modifications of the described embodiment examples of the invention are conceivable and possible without going beyond the scope of the invention.

| Legend | | | |
|---|---|---|---|
| 1 | steering spindle | 36 | nose |
| 2 | shell tube | 37 | tooth bar |
| 3 | console part | 38 | first toothing |
| 4 | sectional | 39 | second toothing |
| 5 | sectional | 40 | first countertoothing |
| 6 | pivot axis | 41 | second countertoothing |
| 7 | front end | 42 | tooth |
| 8 | longituidnal axis | 43 | tooth |
| 9 | bracket | 44 | tooth |
| 10 | universal joint | 45 | tooth |
| 11 | sectional | 46 | adjustment direction |
| 12 | mounting parts | 47 | plane |
| 13 | carrier plate | 48 | plane |
| 14 | counterclocking part | 49 | plane |
| 15 | counterclocking part | 50 | plane |
| 16 | tensioning lever | 51 | angle |
| 17 | tensioning bolt | 52 | spring device |
| 18 | cam disk | 53 | spring |
| 19 | axis | 54 | slide bolt |
| 20 | locking part | 55 | extension |
| 21 | locking part | 56 | guide extension |
| 22 | oblique face | 57 | closure direction |
| 23 | cam | 58 | direction |
| 24 | elongated hole | 59 | groove |
| 25 | elongated hole | 60 | stop extension |
| 26 | elongated hole | 61 | stop extension |
| 27 | bore | 62 | spring device |
| 28 | head | 63 | base body |
| 29 | nut | 64 | base body |
| 30 | axial bearing | 65 | insert part |
| 31 | spring | 65 | insert part |
| 32 | spring | 66 | slide disk |
| 33 | side face | 67 | slide disk |
| 34 | side face | 68 | penetration opening |
| 35 | nose | 69 | spring device |

The invention claimed is:

1. A locking device for use with a steering column which is adjustable in at least one adjustment direction, said locking device comprising:

at least one locking part associated with one of the adjustment directions, said at least one locking part comprising at least one first toothing and at least one second;

at least one counterlocking part associated with said one of the adjustment directions, said at least one counterlocking part comprising at least one first countertoothing and at least one second countertoothing; and one openable and closable tensioning arrangement having an opened state and a closed state, wherein in the opened state the first and second toothings are spaced apart from the first and second countertoothings and in the closed state the locking part and the counterlocking part mesh teeth with one another;

wherein teeth of the toothings and of the countertoothings extend transversely to said one of the adjustment directions and successive teeth of the toothings and countertoothings are each equidistantly spaced apart from one another and tips of the teeth of the toothings and countertoothings each lie in a plane;

wherein the plane of the tips of the teeth of the first toothing and the plane of the tips of the teeth of the second toothing form a V relative to one another and form an angle, and the plane of the tips of the teeth of the first countertoothing and the plane of the tips of the teeth of the second countertoothing form a V with one another and form the same said angle, and wherein the teeth of the first toothing and the teeth of the second toothing are offset from one another in said one of the adjustment directions by a fraction of the distance between successive teeth.

2. The locking device as claimed in claim 1, wherein the offset is one half the distance between successive teeth.

3. The locking device as claimed in claim 1, wherein the first and second toothings are disposed on a tooth bar, which is disposed on or in a base body of the locking part.

4. The locking device as claimed in claim 3, wherein the tooth bar is connected rigidly with or developed integrally with the base body of the locking part.

5. The locking device as claimed in claim 3, wherein the tooth bar is supported displaceably within limits relative to the base body of the locking part in a direction, which is perpendicular to said one of the adjustment directions and perpendicular to a closure direction, in which the locking part and the counterlocking part move toward one another during closing of the tensioning arrangement.

6. The locking device as claimed in claim 5, wherein the tooth bar is supported displaceably within limits against a force of a spring device in or against the closure direction relative to the base body of the locking part.

7. The locking device as claimed in claim 1, wherein the first countertoothing and second countertoothing are disposed substantially, viewed in cross section, in a V-form recess in the counterlocking part.

8. The locking device as claimed in claim 1, further comprising a spring device between the locking part and the counterlocking part, wherein said spring device acts upon the locking part relative to the counterlocking part in a direction perpendicular to said one of the adjustment directions and perpendicular to a closure direction and presses it against a guide extension of the counterlocking part.

9. The locking device as claimed in claim 1, wherein the locking part includes a bore, and the tensioning arrangement includes a tensioning bolt penetrating through the locking part via the bore such that during closure of the tensioning arrangement the locking part is displaced by the tensioning bolt in an axial direction of the tensioning bolt against the counterlocking part.

10. The locking device as claimed in claim 1, wherein said one of the adjustment directions is a direction of height or inclination adjustment of a steering spindle of the steering column.

11. The locking device as claimed in claim 10, further comprising:
    a console part stationary on a chassis;
    a shell tube which receives at least sectionally the steering spindle of the steering column;
    wherein the counterlocking part comprises:
    a side-facing of said console part extending laterally of the shell tube; and
    an elongated hole in the side facing, wherein the tensioning bolt of the tensioning arrangement penetrates through said elongated hole.

12. The locking device as claimed in claim 1, comprising two locking parts and two counterlocking parts engaged in a closed state of the locking device with particular first and second toothings.

13. The locking device as claimed in claim 1, comprising two locking parts and two counterlocking parts engaged in a closed state of the locking device with particular first and second countertoothings.

14. The locking device as claimed in claim 1, wherein the locking part comprises two first and two second toothings, and the counterlocking part comprises two first and two second countertoothings engaging the toothings of the locking part in the closed state of the tensioning arrangement.

15. The locking device as claimed in claim 14, comprising two tooth bars on the locking part on both sides of the tensioning bolt and each comprising a first and a second toothing.

16. The locking device as claimed in claim 14, wherein the two firsttoothings and the two second toothings are offset relative to one another in said one of the adjustment directions by a distance, which is a fraction of a distance between successive teeth.

17. The locking device as claimed in claim 14, wherein the two first countertoothings and the two second countertoothings are offset in the adjustment direction relative to one another by a distance which is a fraction of a distance between successive teeth.

18. The locking device as claimed in claim 16, wherein a distance between center planes between the first and second toothings differs from a distance between center planes between the first and second countertoothings.

19. The locking device as claimed in claim 3, wherein the tooth bar has a penetration opening for the penetration of the tensioning bolt and the first toothing and the second toothing with respect to the tensioning bolt are on opposite sides of the tooth bar and the associated countertoothings of the counterlocking part are located correspondingly on sides of the counterlocking part opposite with respect to the tensioning bolt.

20. The locking device as claimed in claim 19, wherein the tensioning bolt penetrates, with tolerance, the penetration opening in a direction perpendicular to a closure direction and perpendicular to said one of the adjustment directions.

21. The locking device as claimed in claim 1, wherein the locking part, with an adjustment of a steering spindle of the steering column in the one of the adjustment directions, moves jointly with the steering spindle and the counterlocking part is nondisplaceable relative to a console part stationary on a chassis, which supports the steering spindle.

22. The locking device as claimed in claim 1, wherein the locking part, with an adjustment of a steering spindle of the steering column in the one of the adjustment directions, moves jointly with the steering spindle and the counterlocking part is nondisplaceable relative to a console part stationary on a chassis, which supports a shell tube supporting the steering spindle.

23. The locking device as claimed in claim 1, wherein the counterlocking part, with an adjustment of a steering spindle of the steering column in the one of the adjustment directions, moves jointly with the steering spindle and the locking part is nondisplaceable relative to a console part stationary on a chassis, which supports the steering spindle.

24. The locking device as claimed in claim 1, wherein the counterlocking part, with an adjustment of a steering spindle of the steering column in the one of the adjustment directions, moves jointly with the steering spindle and the locking part is nondisplaceable relative to a console part stationary on a chassis, which supports a shell tube supporting the steering spindle.

25. The locking device as claimed in claim 1, further comprising a spring device for spacing the locking part relative to the counterlocking part in the opened state of the tensioning arrangement, and wherein the toothings are disengaged from the countertoothings in the opened state of the tensioning arrangement.

26. A locking device for use with a steering column which is adjustable in at least one adjustment direction, said locking device comprising:
    at least one locking part associated with one of the adjustment directions, said at least one locking part comprising at least one first toothing and at least one second;
    at least one counterlocking part associated with said one of the adjustment directions, said at least one counterlocking part comprising at least one first countertoothing and at least one second countertoothing; and
    one openable and closable tensioning arrangement having an opened state and a closed state, wherein in the opened state the first and second toothings are spaced apart from the first and second countertoothings and in the closed state the locking part and the counterlocking part mesh teeth with one another;
    wherein teeth of the toothings and of the countertoothings extend transversely to said one of the adjustment directions and successive teeth of the toothings and countertoothings are each equidistantly spaced apart from one another and tips of the teeth of the toothings and countertoothings each lie in a plane;
    wherein the plane of the tips of the teeth of the first toothing and the plane of the tips of the teeth of the second toothing form a V relative to one another and form an angle, and the plane of the tips of the teeth of the first countertoothing and the plane of the tips of the teeth of the second countertoothing form a V with one another and form the same said angle, and
    wherein the teeth of the first countertoothing and the teeth of the second countertoothing are offset from one another in said one of the adjustment directions by a fraction of the distance between successive teeth.

27. The locking device as claimed in claim 26, wherein the offset is one half the distance between successive teeth.

28. The locking device as claimed in claim 26, wherein the first and second toothings are disposed on a tooth bar, which is disposed on or in a base body of the locking part.

29. The locking device as claimed in claim 28, wherein the tooth bar is connected rigidly with or developed integrally with the base body of the locking part.

30. The locking device as claimed in claim 28, wherein the tooth bar is supported displaceably within limits relative to the base body of the locking part in a direction, which is perpendicular to said one of the adjustment directions and perpendicular to a closure direction, in which the locking part and the counterlocking part move toward one another during closing of the tensioning arrangement.

31. The locking device as claimed in claim 30, wherein the tooth bar is supported displaceably within limits against a force of a spring device in or against the closure direction relative to the base body of the locking part.

32. The locking device as claimed in claim 26, wherein the first countertoothing and second countertoothing are disposed substantially, viewed in cross section, in a V-form recess in the counterlocking part.

33. The locking device as claimed in claim 26, further comprising a spring device between the locking part and the counterlocking part, wherein said spring device acts upon the locking part relative to the counterlocking part in a direction perpendicular to said one of the adjustment directions and perpendicular to a closure direction and presses it against a guide extension of the counterlocking part.

34. The locking device as claimed in claim 26, wherein the locking part includes a bore, and the tensioning arrangement includes a tensioning bolt penetrating through the locking part via the bore such that during closure of the tensioning arrangement the locking part is displaced by the tensioning bolt in an axial direction of the tensioning bolt against the counterlocking part.

35. The locking device as claimed in claim 26, wherein said one of the adjustment directions is a direction of height or inclination adjustment of a steering spindle of the steering column.

36. The locking device as claimed in claim 35, further comprising:
  a console part stationary on a chassis;
  a shell tube which receives at least sectionally the steering spindle of the steering column;
  wherein the counterlocking part comprises:
  a side-facing of said console part extending laterally of the shell tube; and
  an elongated hole in the side facing, wherein the tensioning bolt of the tensioning arrangement penetrates through said elongated hole.

37. The locking device as claimed in claim 26, comprising two locking parts and two counterlocking parts engaged in a closed state of the locking device with particular first and second toothings.

38. The locking device as claimed in claim 26, comprising two locking parts and two counterlocking parts engaged in a closed state of the locking device with particular first and second countertoothings.

39. The locking device as claimed in claim 26, wherein the locking part comprises two first and two second toothings, and the counterlocking part comprises two first and two second countertoothings engaging the toothings of the locking part in the closed state of the tensioning arrangement.

40. The locking device as claimed in claim 39, comprising two tooth bars on the locking part on both sides of the tensioning bolt and each comprising a first and a second toothing.

41. The locking device as claimed in claim 39, wherein the two first toothings and the two second toothings are offset relative to one another in said one of the adjustment directions by a distance, which is a fraction of a distance between successive teeth.

42. The locking device as claimed in claim 39, wherein the two first countertoothings and the two second countertoothings are offset in the adjustment direction relative to one another by a distance which is a fraction of a distance between successive teeth.

43. The locking device as claimed in claim 41, wherein a distance between center planes between the first and second toothings differs from a distance between center planes between the first and second countertoothings.

44. The locking device as claimed in claim 28, wherein the tooth bar has a penetration opening for the penetration of the tensioning bolt and the first toothing and the second toothing with respect to the tensioning bolt are on opposite sides of the tooth bar and the associated countertoothings of the counterlocking part are located correspondingly on sides of the counterlocking part opposite with respect to the tensioning bolt.

45. The locking device as claimed in claim 44, wherein the tensioning bolt penetrates, with tolerance, the penetration opening in a direction perpendicular to a closure direction and perpendicular to said one of the adjustment directions.

46. The locking device as claimed in claim 26, wherein the locking part, with an adjustment of a steering spindle of the steering column in the one of the adjustment directions, moves jointly with the steering spindle and the counterlocking part is nondisplaceable relative to a console part stationary on a chassis, which supports the steering spindle.

47. The locking device as claimed in claim 26, wherein the locking part, with an adjustment of a steering spindle of the steering column in the one of the adjustment directions, moves jointly with the steering spindle and the counterlocking part is nondisplaceable relative to a console part stationary on a chassis, which supports a shell tube supporting the steering spindle.

48. The locking device as claimed in claim 26, wherein the counterlocking part, with an adjustment of a steering spindle of the steering column in the one of the adjustment directions, moves jointly with the steering spindle and the locking part is nondisplaceable relative to a console part stationary on a chassis, which supports the steering spindle.

49. The locking device as claimed in claim 26, wherein the counterlocking part, with an adjustment of a steering spindle of the steering column in the one of the adjustment directions, moves jointly with the steering spindle and the locking part is nondisplaceable relative to a console part stationary on a chassis, which supports a shell tube supporting the steering spindle.

50. The locking device as claimed in claim 26, further comprising a spring device for spacing the locking part relative to the counterlocking part in the opened state of the tensioning arrangement, and wherein the toothings are disengaged from the countertoothings in the opened state of the tensioning arrangement.

* * * * *